March 20, 1934.  H. T. BUDENBOM  1,951,899
GEOMETRICAL INSTRUMENT
Filed June 20, 1930
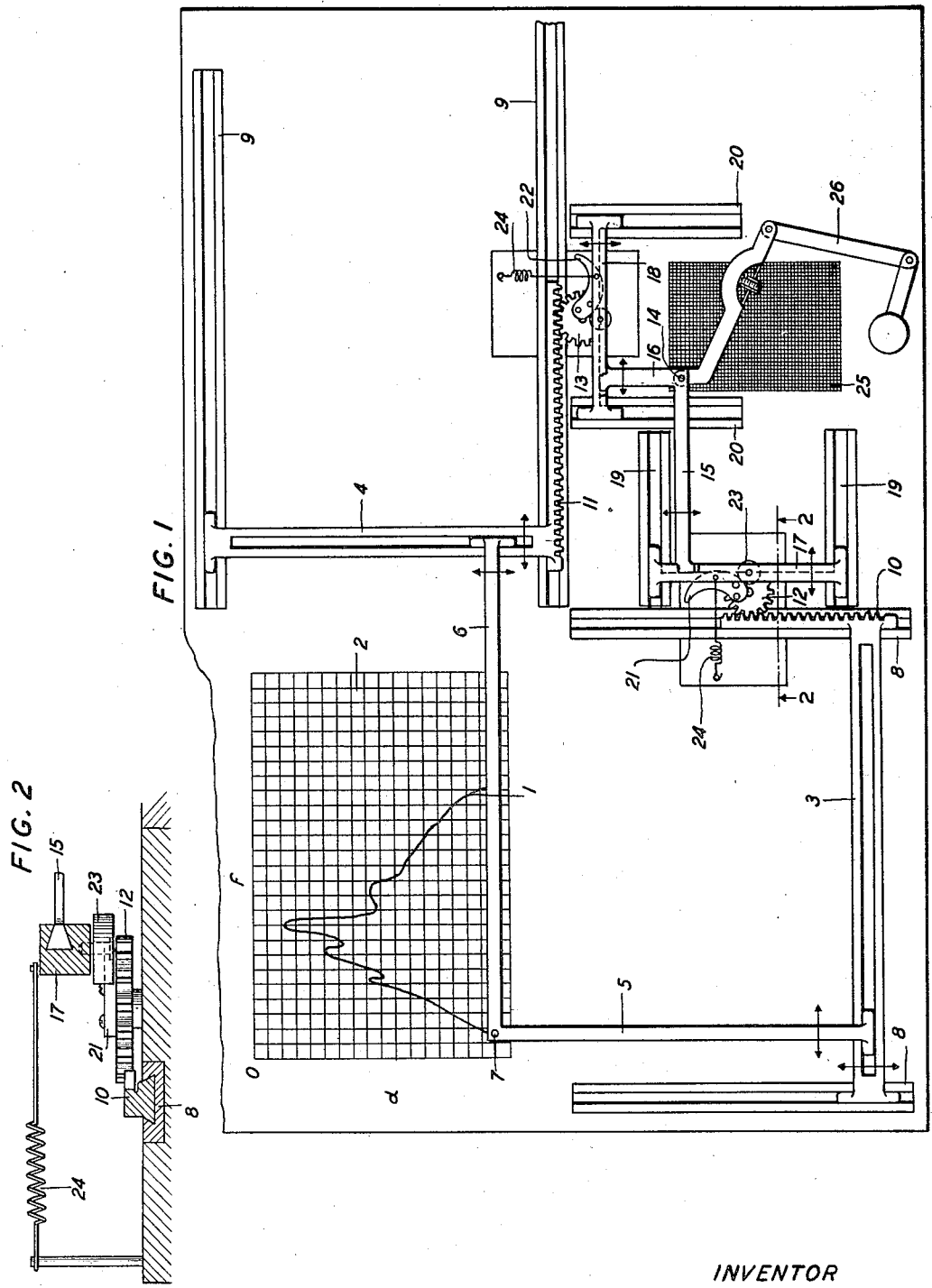
INVENTOR
H.T. BUDENBOM
BY
ATTORNEY Patented Mar. 20, 1934

1,951,899

UNITED STATES PATENT OFFICE 1,951,899

GEOMETRICAL INSTRUMENT

Horace T. Budenbom, Short Hills, N. J., assignor to Bell Telephone Laboratories, Incorporated, New York, N. Y., a corporation of New York Application June 20, 1930, Serial No. 462,526

3 Claims. (Cl. 33—23)

This invention relates to the measurement of certain transmission characteristics of a wave transmission element or system.

An object of the invention is to obtain from observed data by a direct method an index to a transmission characteristic of the system or element.

Heretofore, as in this invention, this measurement of quality was accomplished by operating on a graph of a transmission characteristic of the system. Specifically, a curve showing the relation between frequency and the attenuation suffered by the waves transmitted was used. This curve, while being an indication of the performance of the system, had to be modified so that the importance of certain frequency bands could be emphasized and so that proper weight could be given to each value of attenuation. From a measurement of the area under such a modified curve it is a simple step to evaluate one of the factors affecting quality of transmission.

Prior to applicant's invention it was necessary in order to so modify the curve to select a number of points on it and to multiply the coordinates of each by corresponding weighting factors. These latter factors might be obtained from curves or mathematical functions showing the value of the factor for each particular frequency or value of attenuation. This task was a laborious one when accuracy demanded that a large number of points be taken and was especially lengthy when a number of characteristic curves were to be weighted in this manner.

In accordance with the invention a machine for automatically producing a modified curve from the original frequency-attenuation characteristic and for measuring the area under the curve is provided. It is only necessary, then, to trace over the original curve and observe on a planimeter the area under the modified curve, elements being included in the machine for automatically applying the weighting functions to both frequency and attenuation.

Specifically, to accomplish this result, the frequency-attenuation characteristic of the system must be plotted to scale. In the machine and attached to a pointer which traces the curve, are two arms at right angles to each other, each of which transmits to an associated cam one component of the motion of the tracing pointer. These cams, each of which drives an arm supplying a second pointer with one component of its motion, are designed to transmit displacements proportional not to those of their driving arms but to a function of those displacements as determined by the weighting factor which is to be applied. A planimeter attached to the second pointer measures the area under the modified curve, and from that area the effective volume loss (or gain) introduced by the system may be determined, as will be explained hereinafter.

From the foregoing brief description of a specific embodiment of the invention, it will be evident that the machine is applicable to a number of other uses. It may be used, for instance, wherever a graphically expressed relation between variables is to be modified by another function of either of the variables. The operation performed is not limited to multiplication, but may be addition, subtraction, division, evolution, involution, or may involve trigonometric or other functions, inasmuch as by design of the cams any desired displacement of the second pointer may be obtained for any displacement of the first pointer. Integrations in which one of the terms is given by the graphical expression and the others are reducible to two multiplying functions, one in each variable, may also be performed by embodying the latter two functions in the design of the cams.

Referring to Fig. 1 of the drawing, a specific embodiment of the invention will now be described in detail in its application to measurement of telephone transmission quality. Fig. 2 is a sectional view showing a cam and its driving members.

The curve 1 shows the attenuation-frequency characteristic of a telephone element or system and is drawn to scale on graph sheet 2. By means of the associated apparatus, this curve is modified or weighted, as hereinafter described, in accordance with the greater or less effect of certain frequency bands on the effective volume of the speech transmitted. Since the effect of attenuation on the latter quantity is not given directly by the original curve 1, additional means are provided by this invention for introducing the proper correcting factor.

Sliding members 3 and 4 are actuated through arms 5 and 6, respectively, as pointer 7 traces the curve. By virtue of their sliding engagement with their actuating arms and the constraining action of guiding members 8 and 9, members 3 and 4 each reproduce one of the rectangular components of the motion of pointer 7, member 3 responding to vertical displacements, and member 4 responding to horizontal displacements of the latter. By means of the racks 10 and 11 forming parts of members 3 and 4 respectively, these component motions are transmitted to the respective pinions 12 and 13. At this point of the train of mechanism, we find that the angular displacement of pinion 12 is proportional to the linear displacement of member 3, and therefore, proportional to the attenuation marked by pointer 7. Similarly, the angular displacement of pinion 13 is proportional to the linear displacement of member 4, or to the change in frequency represented by the movement of the pointer.

Turning now to the mechanism driving pen 14, it is seen that the path traced by the latter as it draws the weighted curve, is determined by the displacement of arms 15 and 16. These latter, in turn, derive their motion from members 17 and 18, which are guided in the grooves of members 19 and 20, respectively. By virtue of the sliding engagement of arms 15 and 16 with members 17 and 18, respectively, the motion of each of these latter members is transmitted as a rectangular component of the motion of pen 14. Thus, the motion of member 17 becomes the horizontal component of the motion of pen 14 and that of member 18, the vertical.

The two main portions of the mechanism as thus far described, viz., one portion for analyzing a curve into its components and another portion for combining two components into a resultant, are linked by the cams 21 and 22. These are attached to the pinions 12 and 13 of the first portion of the mechanism, and drive the members 17 and 18 of the second portion. A roller 23, shown in the sectional view, Fig. 2, is mounted on each of the latter, and springs 24 are provided to keep them in contact with the cam surfaces. Since the positions of the cam actuated members 17 and 18 are entirely dependent on the cams and their angular positions, it follows that for any given position of the cam 21 and therefore, for any given frequency, the displacement of 17 may be made any desired amount by properly designing the contour of the cam. Similarly, through the design of the other cam, the displacement of member 18 can be made any desired function of attenuation. For reproducing the original curve cam 22 would be designed to cause displacements directly proportional to, or equal to, the attenuation component of the displacements of tracing pointer 7. The other cam 21 would be designed to reproduce the changes in frequency represented by the horizontal motion of the tracing member, thus giving each frequency band its normal width. If, as in the case about to be described, certain frequency bands are to be given greater weight in determining the shape of the resultant curve, the "frequency" cam is designed to produce greater displacement of pen 14 along the frequency axis of curve sheet 25 when the tracing pointer is traversing these bands on the original curve. The amplitude also of the original curve can be weighted with any function of attenuation that may be desired.

In determining from its frequency-attenuation characteristic curve what change will be produced by a transmission element or system in the apparent or effective volume of speech signals applied to its input terminals, it is necessary to first weight the characteristic with functions of both frequency and attenuation. It has been found that for this purpose the amplitude of the characteristic should be reproduced as $$10^{-\frac{\alpha}{30}}$$

where $\alpha$, the attenuation at any given frequency, is measured in transmission units. It has also been found that the apparent loudness of waves of the same power varies with the frequencies of the waves, the low frequency bands contributing much more to the loudness effect of a complex signal than the higher bands. The function of frequency to be used for modifying the characteristic to take account of this effect will be represented hereinafter as $$\int_0^n G(n)dn.$$

It depends somewhat on the transmission characteristic, itself. For a high quality transmission system, however, the function is as shown graphically on page 242 of "Speech and Hearing" by Dr. Harvey Fletcher (D. Van Nostrand Co., Inc., New York, 1929), to which further reference is made for details as to how to derive the weighting function for a system in which considerable distortion is present.

Incorporating these two functions, one of frequency and the other of attenuation, in the design of the respective cams 21 and 22 and tracing the original curve with the pointer, a resultant curve is obtained which more truly depicts the effect of the system on the volume of speech transmitted. This effect is usually represented numerically by $\bar{\alpha}$, which is related to the integrated area A between the weighted curve and the frequency axis by the equation $$A = 10^{-\frac{\bar{\alpha}}{30}}$$

from which $$\bar{\alpha} = 30 \log_{10}\frac{1}{A}$$

A planimeter 26 is attached to the pen 14 so that A is measured while the pen describes the weighted curve.

The machine above described is especially time- and labor-saving when the effective volume changes introduced by each of a large number of elements is to be determined. All that is required is that the attenuation-frequency curves be plotted to the scale for which the cams are designed.

If the element under test is to be combined in a telephone system with elements of known attenuation characteristics, the overall effective volume factor $\bar{\alpha}$ of the system may be obtained directly from the characteristic of the element if the known characteristic is incorporated in the design of the "frequency" cam. Telephone lines, elements of decidedly varied characteristics, are combined with terminal equipment which may be of one of a few standard types having known characteristics. Thus, by having a few removable "frequency" cams corresponding to these standard characteristics, the performance of a system, as regards effective volume, may be readily obtained from the attenuation-frequency characteristic of the line by selecting the proper cam.

While the invention has been described in detail in connection with its application to determining a factor affecting the quality of a transmission system, it is to be understood that it is capable of widely different uses. A curve may be weighted according to any function of either of its variables or any dependent functions of both variables. In combination with the planimeter, the weighting device is capable of performing a variety of integrating operations, one of the functions always being expressed in graphic form.

These and various other applications of the underlying principle are within the present invention, which is to be limited only by the scope of the appended claims.

What is claimed is:

1. A combination for determining a constant of a system for the electrical transmission of intelligence from a curve showing the relation between frequency and attenuation, comprising a chart bearing said curve plotted to a particular scale, an element for tracing said curve, members associated therewith for transmitting independently the respective components of the motion of said curve tracing element, a driven element, members associated therewith for producing the respective components of the motion thereof, means for actuating each of said last mentioned members in accordance with a predetermined function of the motion of its corresponding first member, said functions involving the relations between frequency and loudness and energy and loudness, respectively, and said actuating means comprising cams designed in accordance with said functions of frequency and energy, respectively.

2. Means for determining a constant of a system for the transmission of intelligence which comprises a curve showing the relation between attenuation and frequency in said system, a pointer for tracing said curve, means for transmitting each component of the motion of said pointer, respective cams operated thereby, one cam causing displacements proportional to $$10^{-\frac{\alpha}{30}},$$

where $\alpha$ is the attenuation component of the displacement of said pointer, and another cam causing displacements proportion to $$\int_0^n G(n)dn,$$

where $n$ is the frequency and $G(n)$ is a particular function of frequency determined by the importance of that frequency as regards loudness of received speech, cooperating members actuated by said cams, and a planimeter connected to and operated by said members.

3. A combination for determining an index to the quality of a speech transmission system comprising a chart bearing a curve that indicates the relation between frequency and attenuation in said system, a member for tracing said curve, means to resolve the motion of said member into its respective components, cams for modifying said resolved component motions independently in accordance with the relation between the transmission index under determination and, respectively, the level of received speech frequencies and the importance of individual frequency bands, and means for applying said modified component motions to the control of the motion of a driven member.

HORACE T. BUDENBOM.